United States Patent
Mori

[19]

[11] Patent Number: 6,059,331
[45] Date of Patent: May 9, 2000

[54] BUMPER REINFORCEMENT STRUCTURE

[75] Inventor: Takeo Mori, Susono, Japan

[73] Assignee: Toyota Jidosha Kabushiki Kaisha, Toyota, Japan

[21] Appl. No.: 09/062,745

[22] Filed: Apr. 20, 1998

[30] Foreign Application Priority Data

May 9, 1997 [JP] Japan ..................................... 9-119540

[51] Int. Cl.$^7$ .................................................. B60R 19/34
[52] U.S. Cl. .......................... 293/133; 293/132; 293/155; 296/189
[58] Field of Search ..................................... 293/132, 120, 293/133, 102, 154, 155, 122; 296/189, 188

[56] References Cited

U.S. PATENT DOCUMENTS

| | | | |
|---|---|---|---|
| 1,505,169 | 8/1924 | Stafford ..................................... | 293/155 |
| 4,076,296 | 2/1978 | Ditto et al. .............................. | 293/122 |
| 4,088,357 | 5/1978 | Klie et al. ............................... | 293/122 |
| 4,457,547 | 7/1984 | Sekiyama et al. .................. | 293/120 X |
| 4,563,028 | 1/1986 | Ogawa et al. ........................... | 293/122 |
| 5,727,827 | 3/1998 | Shibuya et al. .......................... | 293/155 |

FOREIGN PATENT DOCUMENTS

| | | | |
|---|---|---|---|
| 1045183 | 12/1978 | Canada ................................... | 293/120 |
| 169747 | 1/1986 | European Pat. Off. ............... | 293/102 |
| 61-109808 U | 7/1986 | Japan . | |
| 3-25083 | 2/1991 | Japan . | |

*Primary Examiner*—Joseph D. Pape
*Attorney, Agent, or Firm*—Oliff & Berridge, PLC

[57] ABSTRACT

A bumper reinforcement structure having a bumper reinforcement which extends along a vehicle transverse direction of a vehicle body and which is disposed at longitudinal direction end portions of side frames disposed along a vehicle longitudinal direction and which has a projecting portion projecting at least one of further upwardly and further downwardly than the longitudinal direction end portions of the side frames. The bumper reinforcement structure includes a load transmitting portion which is not rigidly fixed to the longitudinal direction end portions of the side frames and which, at the time of a collision, applies to the side frames a force in an opposite direction to a direction in which the projecting portion of the bumper reinforcement projects with respect to the side frames. Accordingly, at the time of a collision, a bending moment, which is in a direction of offsetting a bending moment acting on the side frames, is applied to the side frames via the load transmitting portion.

22 Claims, 9 Drawing Sheets

BUMPER REINFORCEMENT STRUCTURE

BACKGROUND OF THE INVENTION

1. Field of the Invention

The present invention relates to a bumper reinforcement structure, and in particular, to a bumper reinforcement structure provided at a front bumper or a rear bumper of a vehicle such as an automobile or the like.

2. Description of the Related Art

Conventionally, a bumper reinforcement is mounted to a front bumper or a rear bumper of a vehicle such as an automobile or the like. An example of such a bumper reinforcement structure is disclosed in Japanese Utility Model Application Laid-Open (JP-U) No. 61-109808.

As illustrated in FIG. 9, in this bumper reinforcement structure, an upper projecting portion 104A which extends upwardly and a lower projecting portion 104B which extends downwardly are formed at a bumper reinforcement 104 in order to support a bumper 102, which is wide in the vertical direction of the vehicle, to a side frame 100. A vertical direction central portion 104C of the bumper reinforcement 104 is connected to the side frame 100 via a bracket 106 having a mounting portion 106A which extends in the longitudinal direction along the side frame 100.

However, in this bumper reinforcement structure, at the time of a collision, load is applied to one of the upper projecting portion 104A and the lower projecting portion 104B of the bumper reinforcement 104. When the central position of load inputted from the bumper reinforcement 104 shifts upwardly or downwardly with respect to the axial center of the side frame 100, an upward or downward bending moment is generated at the front portion of the side frame 100, and the side frame deforms by bending and buckling without being deformed by axial compression. As a result, the energy absorbing ability at the side frame 100 deteriorates.

In this reinforcement structure, the mounting portion 106A of the bracket 106 is rigidly joined to a front portion 100A of the side frame 100 by bolts 108 and nuts 110 at two fixing portions which are formed with a predetermined interval therebetween in the longitudinal direction of the vehicle. As a result, at the time of a collision, at a front portion 100A of the side frame 100 which is rigidly joined, it is difficult for the mounting portion 106A of the bracket 106 to deform by axial compression. Therefore, the range of axial compressive deformation of the side frame 100 becomes small, and the energy absorbing ability of the of the side frame 100 deteriorates.

SUMMARY OF THE INVENTION

In view of the aforementioned, an object of the present invention is to provide a bumper reinforcement structure which, in a structure in which the bumper reinforcement is projected at least one of upwardly and downwardly further than longitudinal direction end portions of side frames, improves the energy absorbing ability at the side frames.

A first aspect of the present invention is a bumper reinforcement structure having a bumper reinforcement which extends along a vehicle transverse direction of a vehicle body and which is disposed at longitudinal direction end portions of side frames disposed along a vehicle longitudinal direction and which has a projecting portion projecting at least one of further upwardly and further downwardly than the longitudinal direction end portions of the side frames, the bumper reinforcement structure comprising: load transmitting means which is not rigidly fixed to the longitudinal direction end portions of the side frames and which, at the time of a collision, applies to the side frames a force in an opposite direction to a direction in which the projecting portion of the bumper reinforcement projects with respect to the side frames.

Accordingly, at the time of a collision, when the central position of the inputted load from the bumper reinforcement is offset upwardly or downwardly with respect to axial centers of the side frames, an upward or downward bending moment arises at the side frames. However, a force in the direction opposite to the direction of projection with respect to the side frames is applied to the side frames by the load transmitting means. Namely, a bending moment in the direction opposite the aforementioned bending moment is applied to the side frames by the load transmitting means. Further, the load transmitting means is not rigidly joined to the longitudinal direction end portions of the side frames. As a result, the longitudinal direction end portions of the side frames are reliably compressively deformed in the axial direction. Therefore, the energy absorbing ability at the side frames can be improved in a structure in which the bumper reinforcement is projected at least one of upwardly or downwardly further than the longitudinal direction end portions of the side frames.

In a second aspect of the present invention, in the bumper reinforcement structure of the first aspect, the load transmitting means has a pushing surface which opposes, with a slight gap therebetween, surfaces of regions of wall portions of the side frames to which the force in the opposite direction is applied by the load transmitting means, and the pushing surface and the surfaces of the regions of the wall portions of the side frames are inclined and are substantially parallel to one another.

Accordingly, at the time of a collision, the inputted load from the bumper reinforcement is effectively applied to the side frames via the pushing surface of the load transmitting means and surfaces of regions of wall portions of the side frames to which the force in the opposite direction is applied by the load transmitting means, the pushing surface and the surfaces of the regions of the wall portions of the side frames being inclined surfaces substantially parallel to one another. As a result, the longitudinal direction end portions of the side frames are reliably compressively deformed in the axial direction. Therefore, the energy absorbing ability at the side frames can be improved in a structure in which the bumper reinforcement is projected at least one of upwardly or downwardly further than the longitudinal direction end portions of the side frames.

DESCRIPTION OF THE PREFERRED EMBODIMENTS

A first embodiment of the bumper reinforcement structure of the present invention will be described hereinafter in accordance with FIGS. 1 through 3.

In the figures, arrow FR points toward the front of the vehicle, arrow UP points toward the top of the vehicle, and arrow IN points toward the widthwise inner side of the vehicle.

Figure 1:
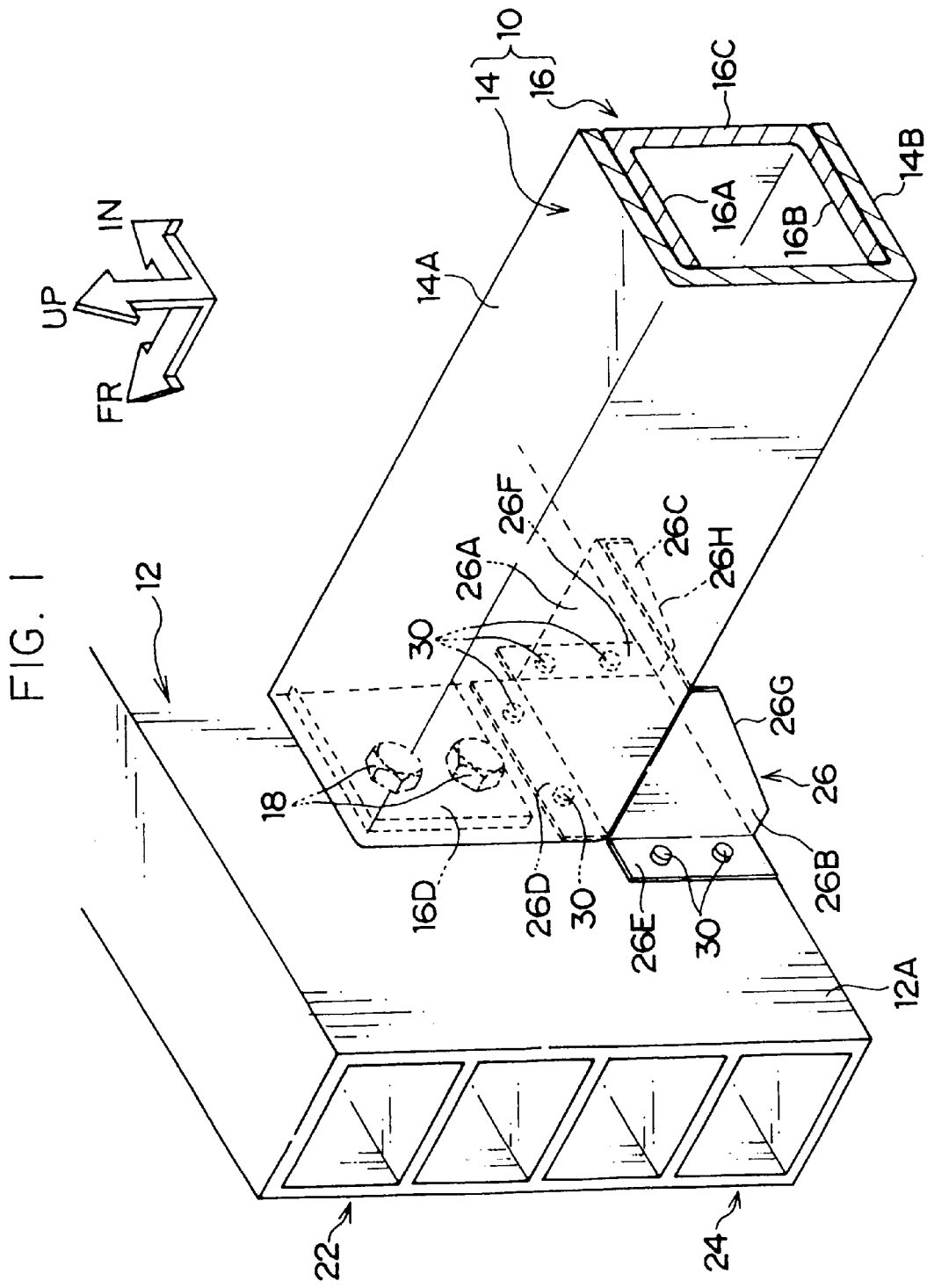
FIG. 1 is a perspective view of a bumper reinforcement structure relating to a first embodiment of the present invention, as seen obliquely from the rear of a vehicle and from the outer side of the vehicle.

As illustrated in FIG. 1, the present embodiment is a front bumper. A bumper reinforcement 12 is mounted to the front end portions of front side members 10 which serve as side frames and are disposed at the left and right sides of the vehicle along the longitudinal direction of the vehicle in vicinities of lower portions of the vehicle transverse direction ends of the front portion of the vehicle. (The right side front side member is omitted from the figures.)

The front side member 10 is formed by a front side member outer panel 14, which forms the vehicle transverse direction outer side portion of the front side member 10, and a front side member inner panel 16, which forms the vehicle transverse direction inner side portion of the front side member 10. The cross-sectional configuration of the front portion of the front side member outer panel 14 as seen in the vehicle longitudinal direction is a substantial U-shape whose open portion is oriented toward the vehicle transverse direction inner side. The cross-sectional configuration of the front portion of the front side member inner panel 16 as seen in the vehicle longitudinal direction is a substantial U-shape whose open portion is oriented toward the vehicle transverse direction outer side. An upper wall portion 16A of the front side member inner panel 16 is welded to the lower surface of an upper wall portion 14A of the front side member outer panel 14, and a lower wall portion 16B of the front side member inner panel 16 is welded to the upper surface of a lower wall portion 14B of the front side member outer panel 14. The front side member 10 has a closed cross-sectional structure extending in the longitudinal direction of the vehicle.

Figure 2:
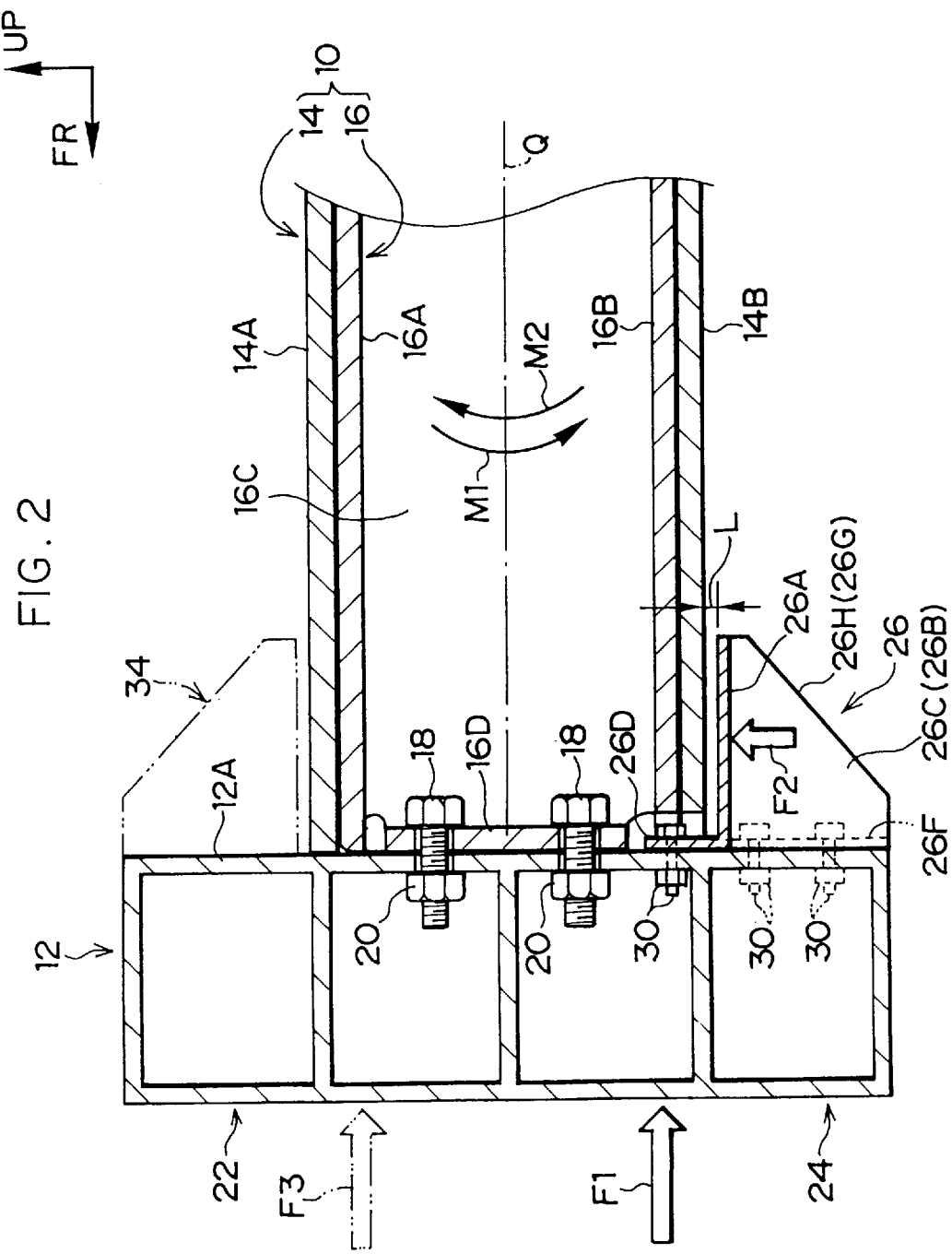
FIG. 2 is a side sectional view of the bumper reinforcement structure relating to the first embodiment of the present invention.

As illustrated in FIG. 2, a flange 16D, which extends toward the vehicle transverse direction outer side along the bumper reinforcement 12, is formed at the front end portion of a vertical wall portion 16C of the front side member inner panel 16. The bumper reinforcement 12 is joined to the front side member 10 by weld bolts 18, which are disposed at the flange 16D so as to be directed toward the front of the vehicle, and nuts 20, which are screwed with the weld bolts 18.

The bumper reinforcement 12 is formed of four portions which have rectangular closed cross-sections, are stacked one above the other, and extend substantially in the transverse direction of the vehicle. Among these closed cross-section portions, the topmost closed cross-section portion is an upper projecting portion 22 which projects further toward the top of the vehicle than the front end portion of the front side member 10, and the bottommost closed cross-section portion is a lower projecting portion 24 which projects further toward the bottom of the vehicle than the front end portion of the front side member 10.

As illustrated in FIG. 1, a bracket 26 serving as a load transmitting means is disposed at a rear wall portion 12A of the bumper reinforcement 12 at the rear side of the lower projecting portion 24 at a position beneath the lower wall portion 14B of the front side member outer panel 14. The configuration of the bracket 26 as seen from the rear of the vehicle is a U-shape whose open portion is directed downward, and is formed by a vehicle transverse direction outer wall portion 26B and a vehicle transverse direction inner wall portion 26C which are directed downward at the vehicle transverse direction end portions of an upper wall portion 26A.

A flange 26D which is directed upward is formed at the front end portion of the upper wall portion 26A of the bracket 26. A flange 26E which is directed toward the vehicle transverse direction outer side is formed at the front end portion of the vehicle transverse direction outer wall portion 26B of the bracket 26. A flange 26F which is directed toward the vehicle transverse direction inner side is formed at the front end portion of the vehicle transverse direction inner wall portion 26C of the bracket 26. The flanges 26D, 26E, 26F are respectively fixed to the rear wall portion 12A of the bumper reinforcement 12 by fixing members 30 such as bolts, nuts, or the like.

As illustrated in FIG. 2, the upper wall portion 26A of the bracket 26 is a planar surface which opposes, with a slight gap L therebetween, the lower wall portion 14B of the front side member outer panel 14. At the time of a collision, the upper wall portion 26A abuts the lower wall portion 14B of the front side member outer panel 14, and the front end of the front side member outer panel 14 is pushed upward. Further, as seen in side view, the configurations of the vehicle transverse direction outer wall portion 26B and the vehicle transverse direction inner wall portion 26C are trapezoidal configurations with rear edge portions 26G, 26H thereof being inclined upwardly toward the rear of the vehicle.

Next, operation of the present first embodiment will be described.

At the bumper reinforcement structure of the present first embodiment, when a load (arrow F1 in FIG. 2) is received from the front of the vehicle at the lower portion of the bumper reinforcement 12 due to a collision, because the bumper reinforcement 12 projects further downward than the front end of the front side member 10, a larger load can be transmitted to the front side member 10 than in a case in which the bumper reinforcement 12 does not project further downward than the front end of the front side member 10.

In this case, in a structure in which the bumper reinforcement 12 merely projects downward, the input center of the load F1 is offset downwardly from the axial center Q of the front side member 10. Therefore, a downward bending moment M1 is applied to the front portion of the front side member 10.

As a result, in the present first embodiment, by providing the bracket 26 at the rear portion of the lower projecting portion 24 of the bumper reinforcement 12, at the time of a collision, the lower portion of the bumper reinforcement 12 moves rearward due to the load F1. When the bumper reinforcement 12 is inclined, the upper wall portion 26A of the bracket 26 abuts the lower wall portion 14B of the front side member outer panel 14, and the front portion of the front side member outer panel 14 is pushed upward by the force F2. As a result, the bending moment M1 and a moment M2 in the opposite direction (upward) are generated at the front portion of the front side member 10. Therefore, the moment M1 and the moment M2 offset one another, and bending/buckling (bending over) of the front portion of the front side member 10 can be prevented.

Further, in the present first embodiment, the upper wall portion 26A of the bracket 26 is not fixed to the lower wall portion 14B of the front side member outer panel 14, and axial compressive deformation of the front portion of the front side member 10 is not restricted. Therefore, the region of axial compressive deformation of the front portion of the front side member 10 is enlarged.

Figure 3:
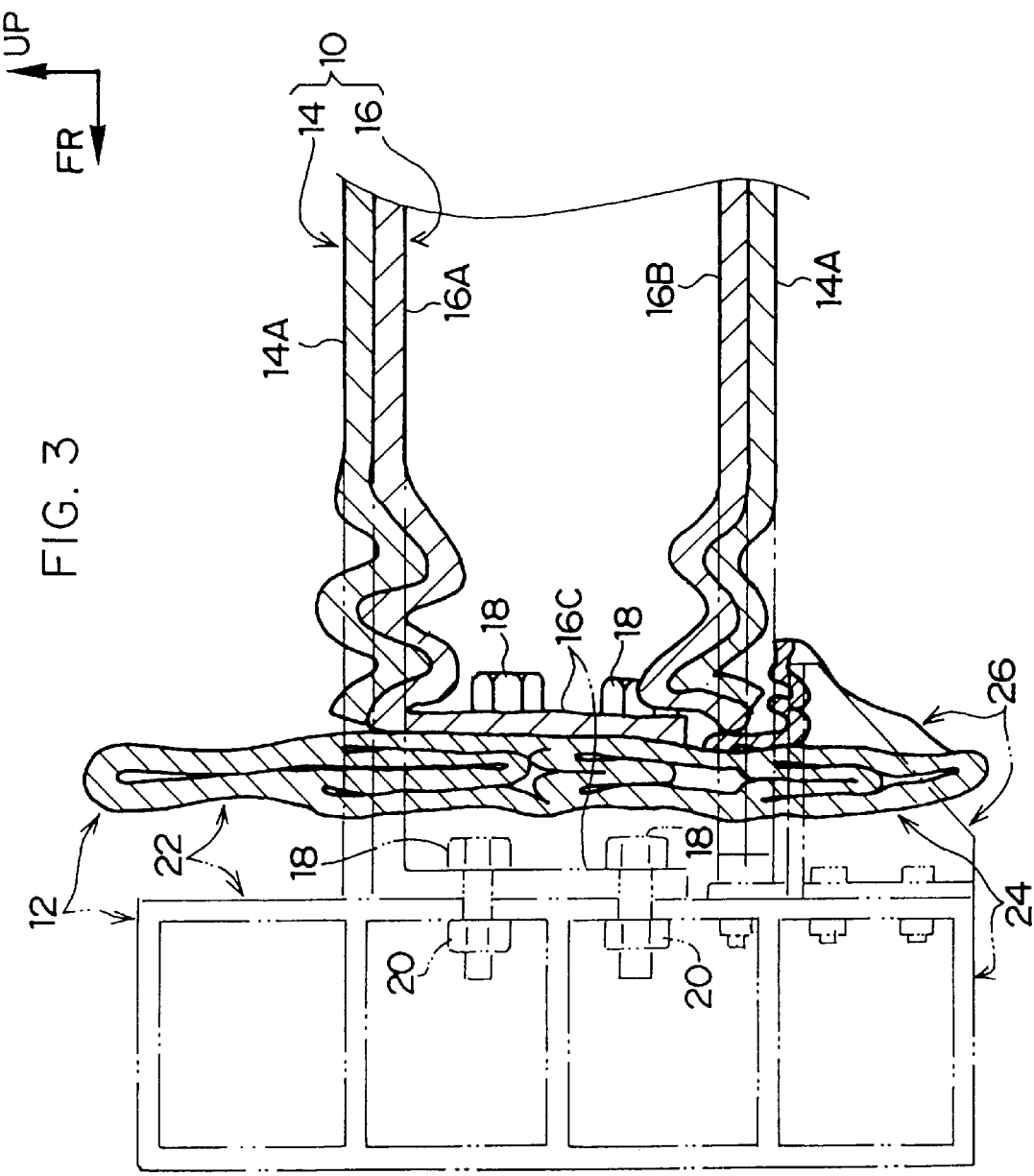
FIG. 3 is a side sectional view illustrating a deformed state, at the time of a collision, of the bumper reinforcement structure relating to the first embodiment of the present invention.

As a result, the front portion of the front side member 10 axially compressively deforms reliably as illustrated by the solid line in FIG. 3, from the state illustrated by the two-dot chain line in FIG. 3. Therefore, the energy absorbing ability of the front side member 10 can be improved.

Further, in the present first embodiment, the bracket 26 is mounted to the rear portion of the lower projecting portion 24 of the bumper reinforcement 12. Therefore, a conventional bumper reinforcement 12 can be used.

Figure 4:
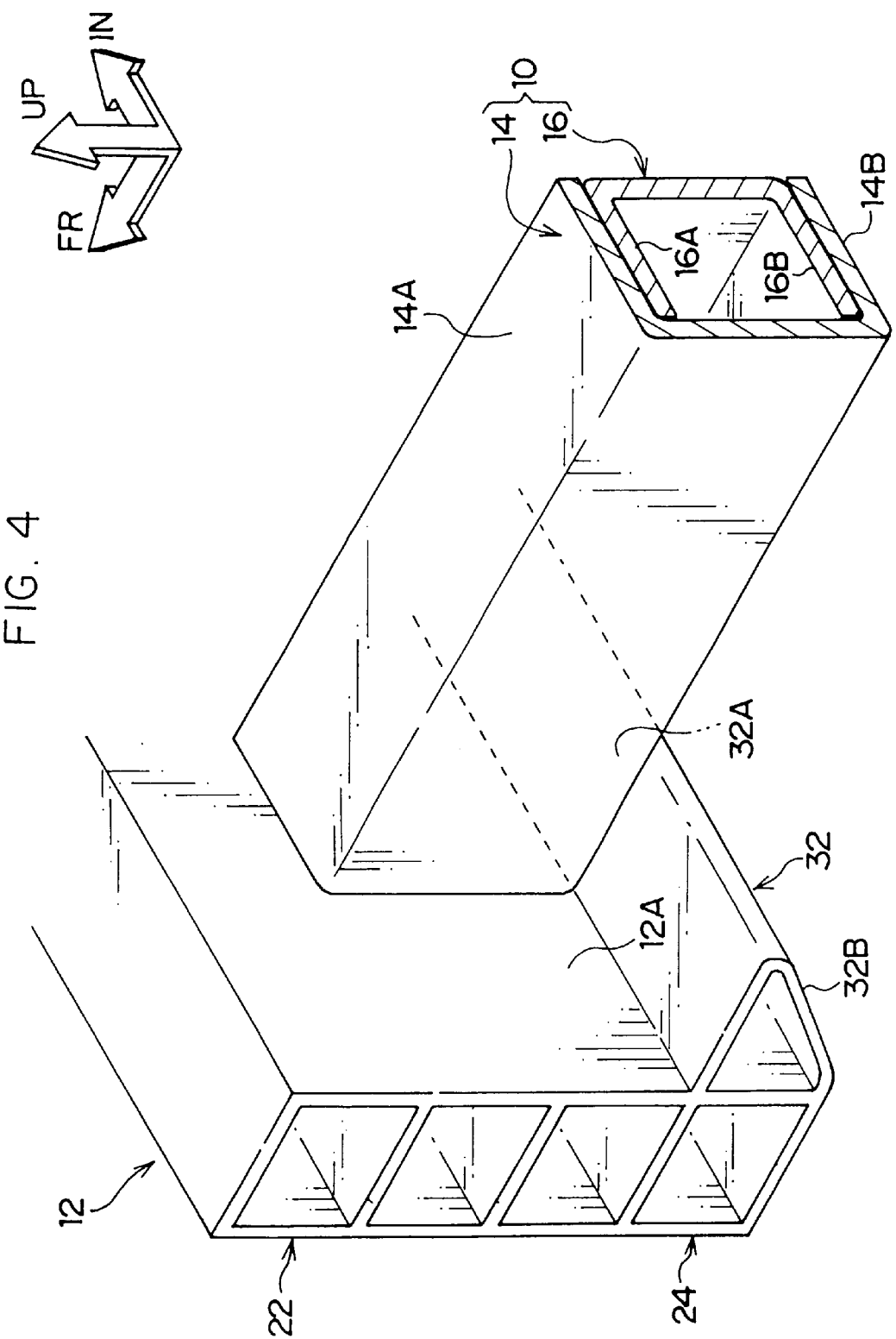
FIG. 4 is a perspective view of a bumper reinforcement structure relating to a variant example of the first embodiment of the present invention, as seen obliquely from the rear of the vehicle and from the outer side of the vehicle.

In the present first embodiment, the bracket 26 serving as a load transmitting means is provided at a region of the rear wall portion 12A which is the rear portion of the lower projecting portion 24 of the bumper reinforcement 12. However, in place of the bracket 26, as illustrated in FIG. 4, a rear projecting portion 32, which serves as a load transmitting means and is integral with the bumper reinforcement 12, may be formed along the entire vehicle transverse direction length of the bumper reinforcement 12. The rear projecting portion 32 is formed along the lower projecting portion 24 of the bumper reinforcement 12 at the rear portion of the lower projecting portion 24. An upper wall portion 32A is a planar surface which opposes, with a slight gap therebetween, the lower wall portion 14B of the front side member outer panel 14. As a result, at the time of a collision, the upper wall portion 32A of the rear projecting portion 32 abuts the lower wall portion 14B of the front side member outer panel 14, and the front portion of the front side member outer panel 14 is pushed upward. Further, because the rear projecting portion 32 is formed along the entire vehicle transverse direction length of the bumper reinforcement 12, the torsional rigidity of the bumper reinforcement 12 improves. Moreover, the configuration of the rear projecting portion 32 as seen in side view is a trapezoidal configuration whose rear wall portion 32B is directed upwardly toward the rear of the vehicle.

In the present first embodiment, the bracket 26 serving as a load transmitting means is provided at a region of the rear wall portion 12A which is the rear portion of the lower projecting portion 24 of the bumper reinforcement 12 as a provision against a case in which load (arrow F1 in FIG. 2) from the front of the vehicle is received at the lower portion of the bumper reinforcement 12 due to a collision. However, a bracket 34, which serves as a load transmitting means and is illustrated by the two-dot chain line in FIG. 2, may be disposed in the same way as the bracket 26 but at a region of the rear wall portion 12A which is the rear portion of the upper projecting portion 22 of the bumper reinforcement 12, as a provision against a case in which a load (arrow F3 in FIG. 2) from the front of the vehicle is received at the upper portion of the bumper reinforcement 12 due to a collision.

Figure 5:
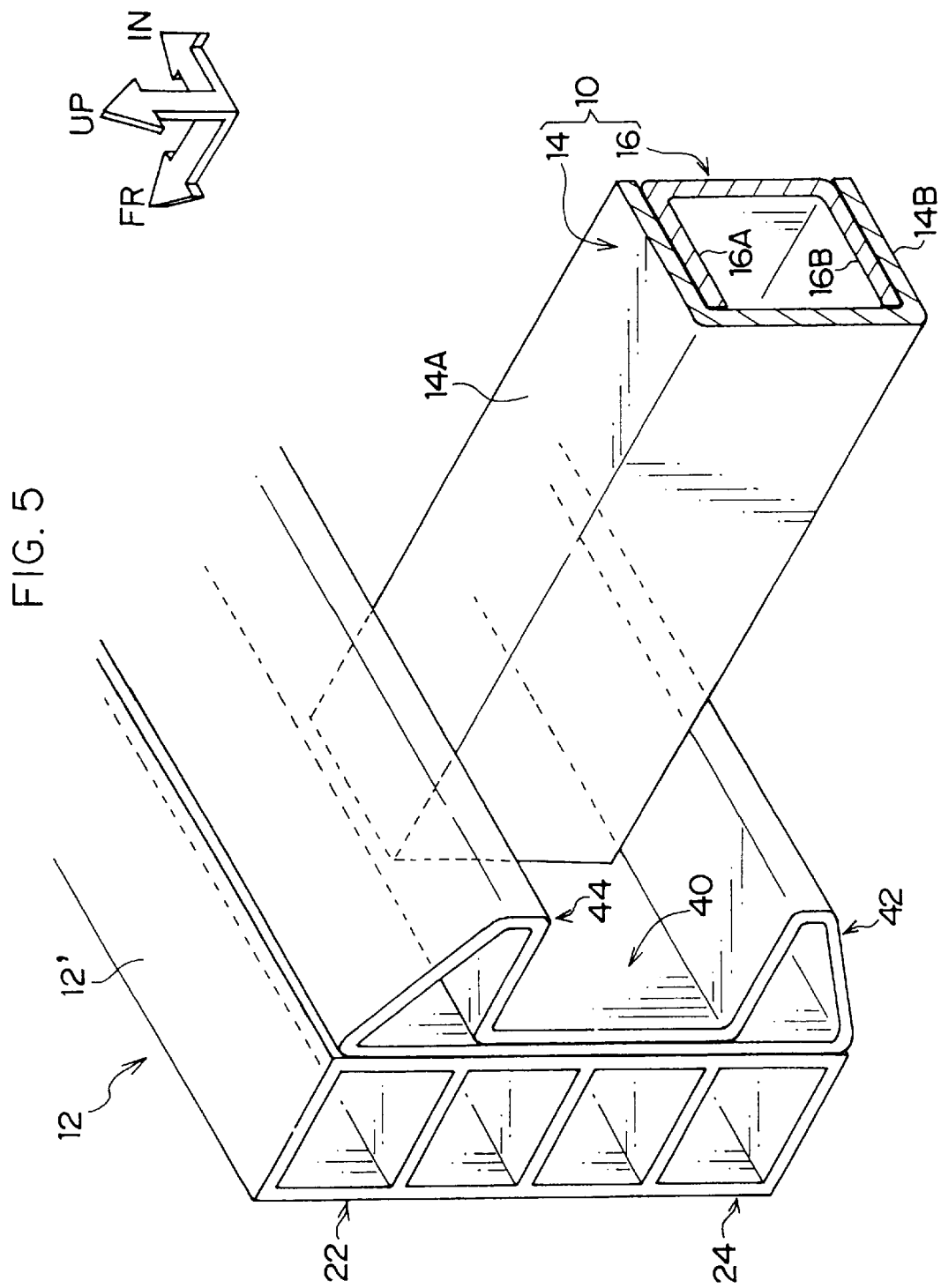
FIG. 5 is a perspective view of a bumper reinforcement structure relating to another variant example of the first embodiment of the present invention, as seen obliquely from the rear of the vehicle and from the outer side of the vehicle.

As illustrated in FIG. 5, the bumper reinforcement 12 may include a main bumper reinforcement 12' and an auxiliary bumper reinforcement 40. A lower rear projecting portion 42 serving as a load transmitting means may be formed along the entire vehicle transverse direction length of the auxiliary bumper reinforcement 40 at the lower portion of the auxiliary bumper reinforcement 40 which is positioned behind the lower projecting portion 24 of the main bumper reinforcement 12'. An upper rear projecting portion 44 serving as a load transmitting means may be formed along the entire vehicle transverse direction length of the auxiliary bumper reinforcement 40 at the upper portion of the auxiliary bumper reinforcement 40 which is positioned behind the upper projecting portion 22 of the main bumper reinforcement 12'.

Figure 6:
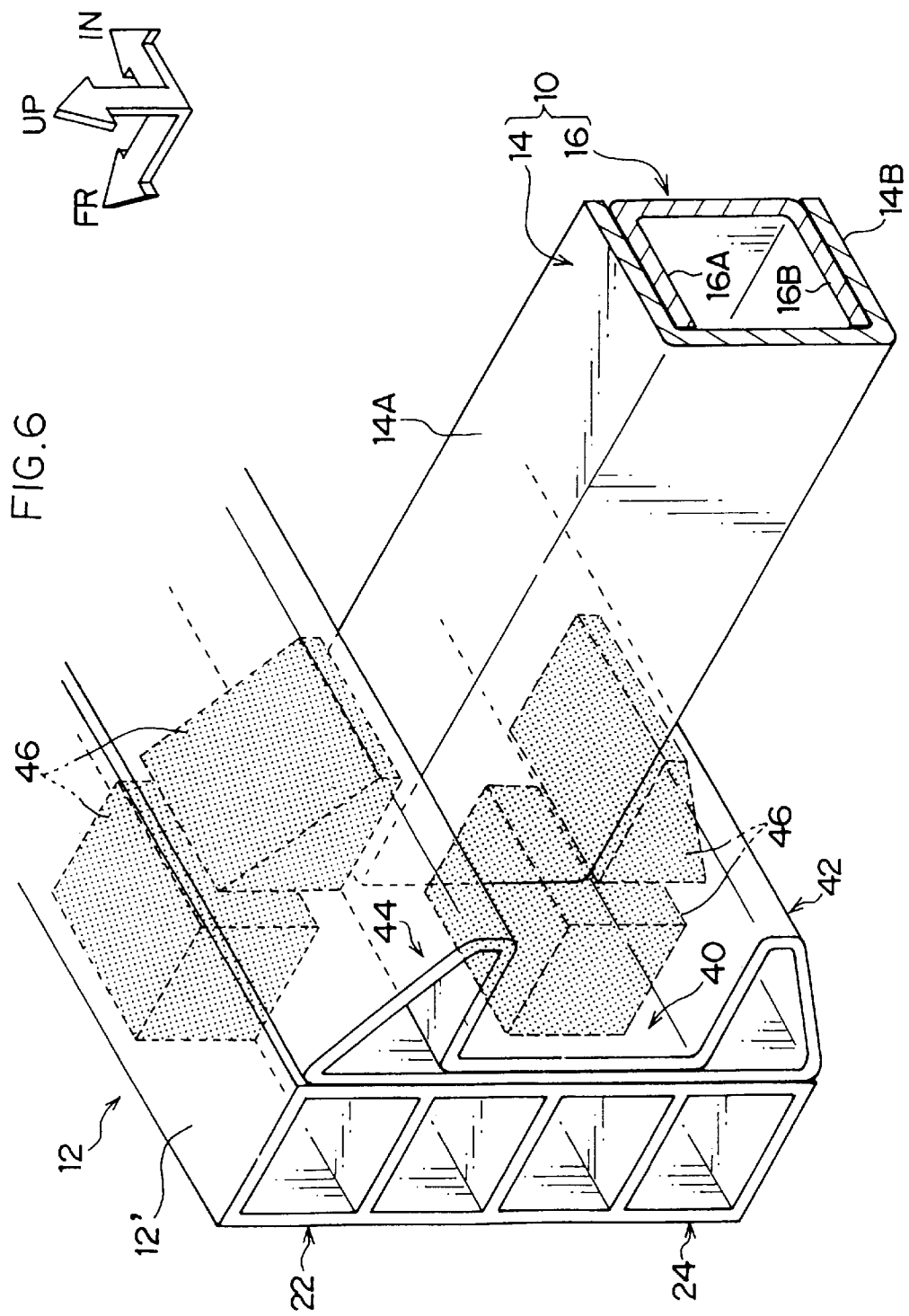
FIG. 6 is a perspective view of a bumper reinforcement structure relating to yet another variant example of the first embodiment of the present invention, as seen obliquely from the rear of the vehicle and from the outer side of the vehicle.

Further, as illustrated in FIG. 6, a filler material 46 such as foamed urethane or the like may be disposed at the inner regions of the upper projecting portion 22 and the lower projecting portion 24 of the main bumper reinforcement 12' and the lower rear projecting portion 42 and the upper rear projecting portion 44 of the auxiliary bumper reinforcement 40, which regions are buffer portions of the bumper reinforcement 12 with the front portion of the front side member 10. In this way, the strength of these regions is improved.

Next, a second embodiment of the bumper reinforcement structure of the present invention will be described with reference to FIGS. 7–9.

Members which are the same as those of the first embodiment are denoted by the same reference numerals, and description thereof is omitted.

Figure 7:
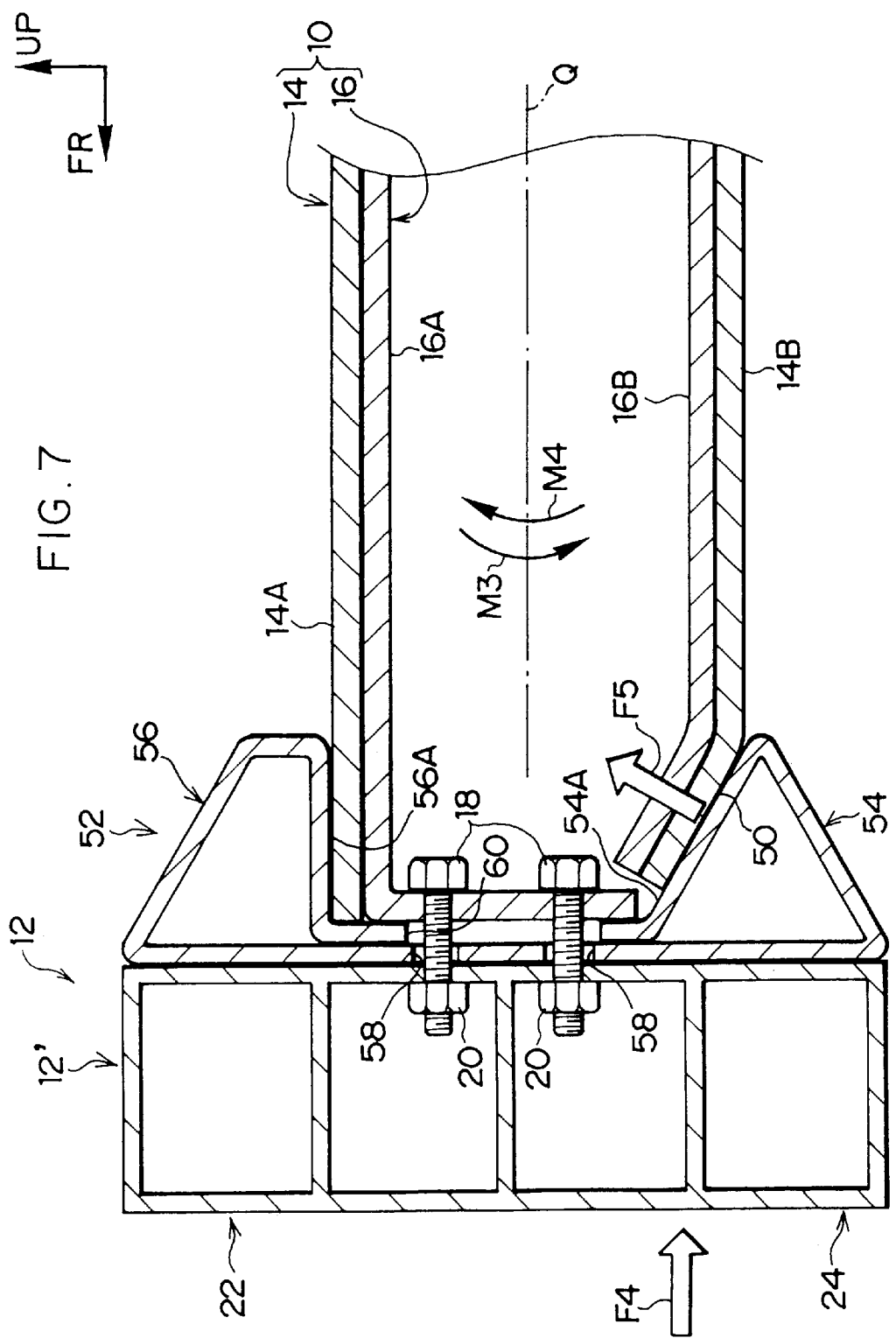
FIG. 7 is a side sectional view illustrating a bumper reinforcement structure relating to a second embodiment of the present invention.

As illustrated in FIG. 7, in the present second embodiment, an inclined surface 50, which extends downwardly toward the rear of the vehicle, is formed at the lower portion of the front end of the front side member 10. An auxiliary bumper reinforcement 52 is disposed behind and along the main bumper reinforcement 12' of the bumper reinforcement 12. A lower rear projecting portion 54 serving as a load transmitting means is formed along the entire vehicle transverse direction length of the auxiliary bumper reinforcement 52 at the lower portion of the auxiliary bumper reinforcement 52 which is positioned behind the lower projecting portion 24 of the main bumper reinforcement 12'. Further, an upper rear projecting portion 56 serving as a load transmitting means is formed along the entire vehicle transverse direction length of the auxiliary bumper reinforcement 52 at the upper portion of the auxiliary bumper reinforcement 52 which is positioned behind the upper projecting portion 22 of the main bumper reinforcement 12'.

The configuration of the lower rear projecting portion 54 as seen in side view is triangular. An upper wall portion 54A is disposed parallel to the inclined surface 50 of the front side member 10. The upper wall portion 54A of the lower rear projecting portion 54 and the inclined surface 50 of the front side member 10 are not joined. The configuration of the upper rear projecting portion 56 as seen in side view is trapezoidal. A lower wall portion 56A is disposed parallel to the upper wall portion 14A of the front side member outer panel 14. The lower wall portion 56A of the upper rear projecting portion 56 and the upper wall portion 14A of the front side member outer panel 14 are not joined.

Figure 8:
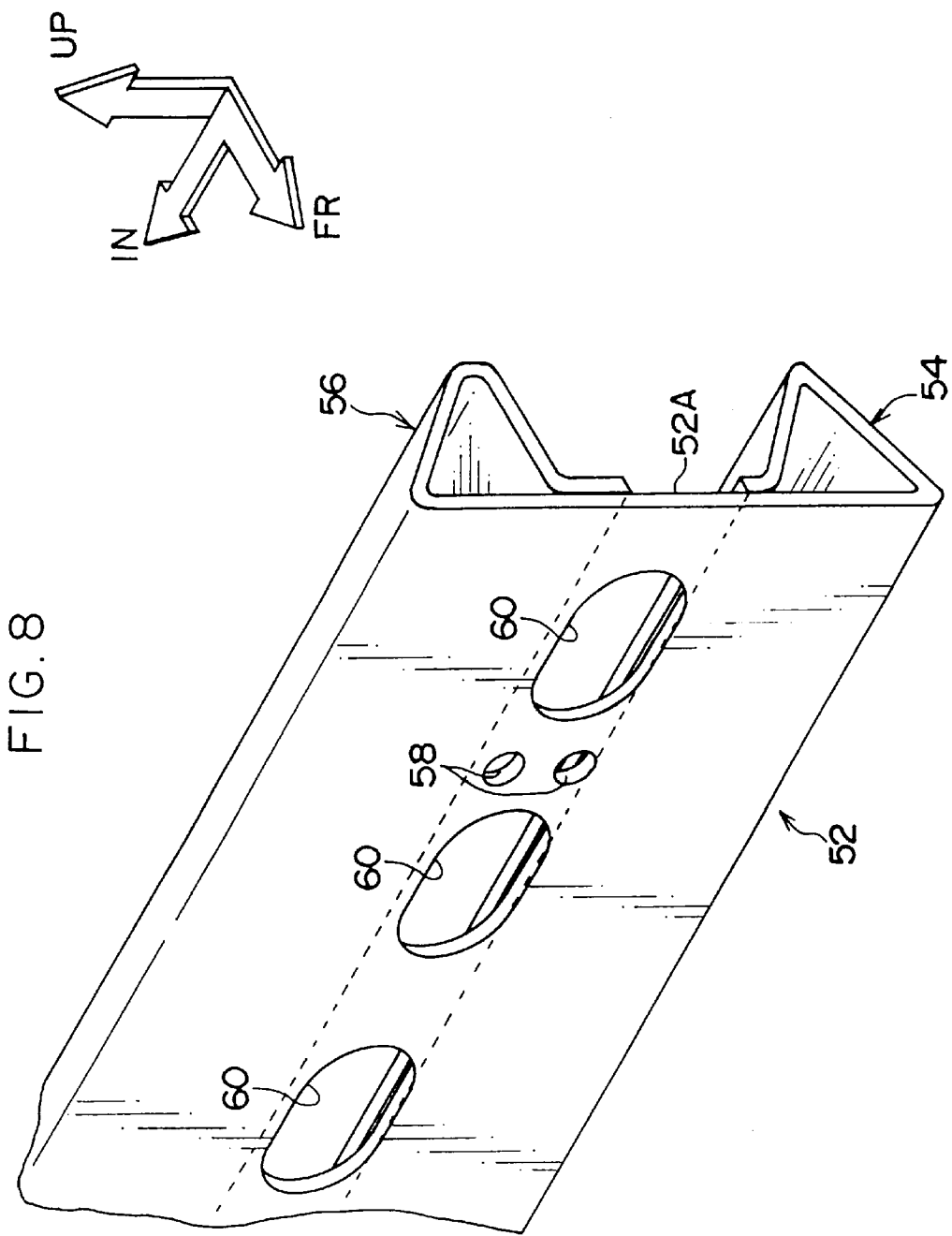
FIG. 8 is a perspective view of an auxiliary bumper reinforcement of the bumper reinforcement structure relating to the second embodiment of the present invention, as seen obliquely from the rear of the vehicle and from the outer side of the vehicle.
Figure 9:
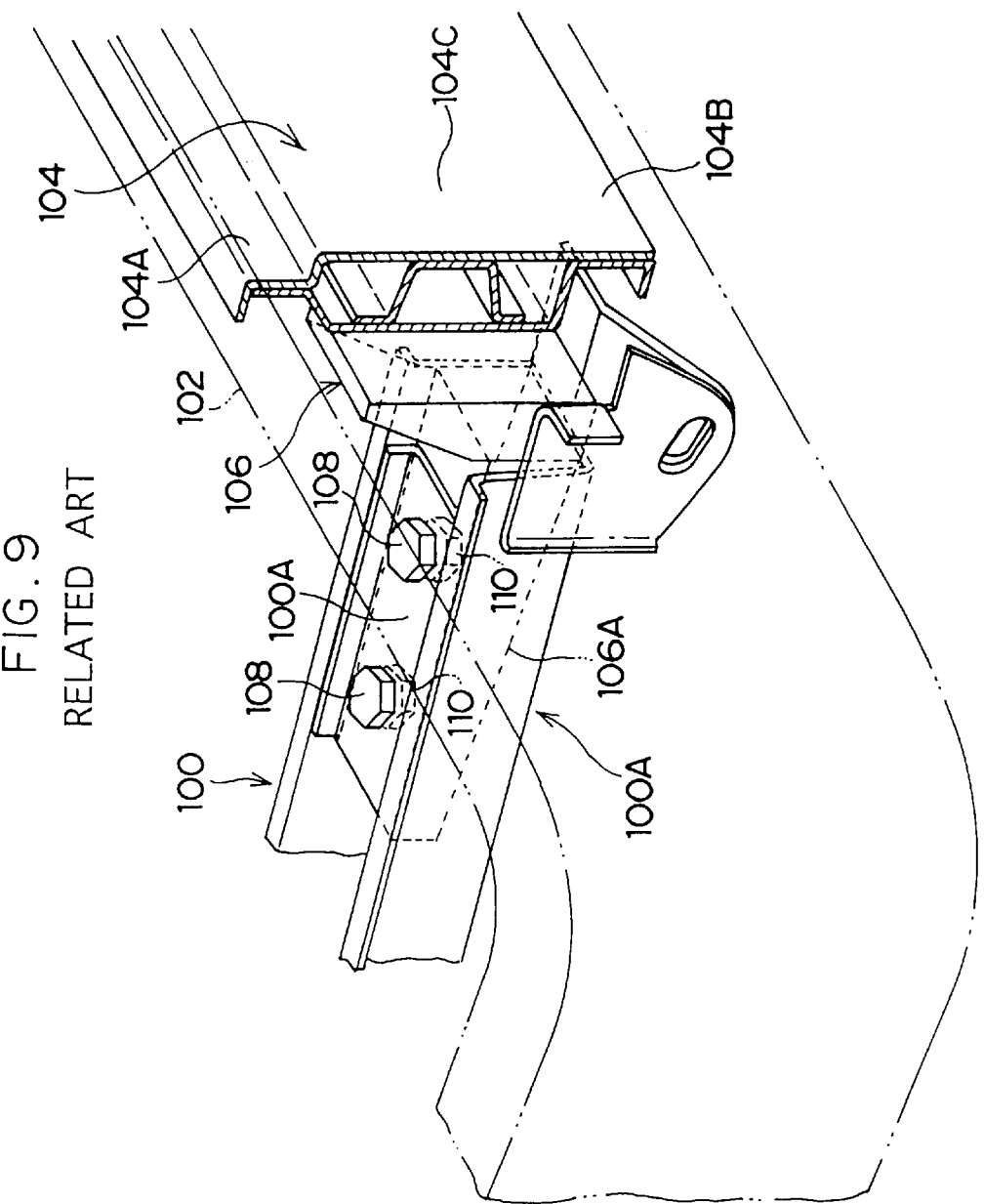
FIG. 9 is a perspective view illustrating a bumper reinforcement structure relating to a conventional embodiment.

As illustrated in FIG. 8, the vertical direction intermediate portion of the auxiliary bumper reinforcement 52 is a mounting portion 52A. Through-holes 58 for the weld bolts 18 and notches 60 in order to make the structure more lightweight are formed in the mounting portion 52A.

Next, operation of the second embodiment will be described.

In the bumper reinforcement structure of the present second embodiment, when a load (arrow F4 in FIG. 7) is received from the front of the vehicle at the lower portion of the bumper reinforcement 12 due to a collision, because the bumper reinforcement 12 projects further downward than the front end of the front side member 10, a greater load can be transmitted to the front side member 10 than in a case in which the bumper reinforcement 12 does not project further downward than the front end of the front side member 10.

In this case, in the structure in which the bumper reinforcement 12 merely projects downward, the center of input of the load F4 is offset downwardly from the axial center Q of the front side member 10. Therefore, a downward bending moment M3 is applied to the front portion of the front side member 10.

In the present second embodiment, the inclined surface 50 which extends downward and toward the rear of the vehicle is formed at the lower portion of the front end of the front side member 10, and the upper wall portion 54A of the lower rear projecting portion 54 of the auxiliary bumper reinforcement 52 of the bumper reinforcement 12 is made to oppose the inclined surface 50. Therefore, at the time of a collision, when the lower portion of the bumper reinforcement 12 moves rearward due to load F4, the upper wall portion 54A of the lower rear projecting portion 54 abuts the inclined surface 50 of the front side member 10, and the front portion of the front side member outer panel 14 is pushed obliquely upward and rearward by force F5.

Accordingly, the input load from the bumper reinforcement 12 is efficiently applied to the front portion of the front side member 10 via the upper wall portion 54A of the lower rear projecting portion 54 and the inclined surface 50 of the front side member 10, which are inclined surfaces substantially parallel to one another.

As a result, because a moment M4 in the opposite direction (upward) as the bending moment M3 is generated at the front portion of the front side member 10, the moment M3 and the moment M4 offset one another so that the bending/buckling (bending over) of the front portion of the front side member 10 can be effectively prevented. As a result, the front portion of the front side member 10 can be reliably axially compressively deformed, and the energy absorbing ability of the front side member 10 can be improved.

In the present second embodiment, the inclined surface 50 which extends toward the rear of the vehicle and downward is formed at the lower portion of the front end of the front side member 10. The upper wall portion 54A of the lower rear projecting portion 54 of the auxiliary bumper reinforcement 52 of the bumper reinforcement 12 opposes the inclined surface 50. However, an inclined surface which extends toward the rear of the vehicle and upward may also be formed at the upper portion of the front end of the front side member 10, and the lower wall portion of the upper rear projecting portion of the auxiliary bumper reinforcement 52 of the bumper reinforcement 12 may be made to oppose this inclined surface.

Further, in place of the auxiliary bumper reinforcement 52, a bracket such as that of the first embodiment may be used.

In the above description, specific embodiments of the present invention were described. However, the present invention is not limited to these embodiments, and it should be clear to those skilled in the art that other embodiments are possible within the scope of the present invention. For example, the bumper reinforcement structure of the present invention may be applied to a bumper reinforcement structure of a rear bumper as well.

What is claimed is:

1. A bumper reinforcement structure for vehicle side frames, the structure including a bumper reinforcement which extends transverse to a vehicle body and which is disposed at longitudinal end portions of the vehicle side frames, which are disposed along a longitudinal vehicle direction and define a vehicle side frame axial center, the bumper reinforcement having a projecting portion projecting at least one of further upwardly or further downwardly than the longitudinal end portions of the vehicle side frames, said bumper reinforcement structure further comprising:

load transmitting means which is not rigidly fixed to longitudinally extending side walls of the vehicle side frames and which, at the time of a collision, applies to the side walls of the vehicle side frames a force that creates a second bending moment in a direction opposite to a first bending moment applied to the vehicle side frames by a collision force acting on the bumper reinforcement at a position offset from the axial center of the vehicle side frames.

2. A bumper reinforcement structure according to claim 1, wherein said load transmitting means has a pushing surface which opposes, with a slight gap therebetween, surfaces of the side walls of the vehicle side frames to which said force is applied by said load transmitting means, and the pushing surface and the surfaces of the side walls of the vehicle side frames are inclined with respect to the axial center and are substantially parallel to one another.

3. A bumper reinforcement structure according to claim 1, wherein said load transmitting means is a bracket which is mounted to the bumper reinforcement.

4. A bumper reinforcement structure according to claim 1, wherein said bumper reinforcement has a second projecting portion which projects along the longitudinal vehicle direction parallel with the vehicle side frames, said second projecting portion also including said load transmitting means.

5. A bumper reinforcement structure according to claim 4, wherein said second projecting portion extends along a longitudinal direction of the bumper reinforcement.

6. A bumper reinforcement structure according to claim 5, wherein a vehicle longitudinal direction cross-section of said second projecting portion is a hollow, closed cross-section.

7. A bumper reinforcement structure according to claim 1, wherein the bumper reinforcement has a main bumper reinforcement positioned at a side far from the longitudinal end portions of the side frames and an auxiliary bumper reinforcement positioned at a side close to the longitudinal end portions of the side frames, and said load transmitting means is provided at the auxiliary bumper reinforcement.

8. A bumper reinforcement structure according to claim 7, wherein said load transmitting means has a second projecting portion which projects along a longitudinal direction of the side frames in the same direction as a direction in which the side frames extend, said second projecting portion applying to the side frames said force in the opposite direction.

9. A bumper reinforcement structure according to claim 8, wherein said second projecting portion extends longitudinally along the auxiliary bumper reinforcement.

10. A bumper reinforcement structure according to claim 9, wherein a vehicle longitudinal direction cross-section of said second projecting portion is a hollow, closed cross-section.

11. A bumper reinforcement structure according to claim 10, wherein a filler material is provided at a region of the auxiliary bumper reinforcement and at a region of the main bumper reinforcement, which regions buffer portions for the longitudinal end portions of the side frames, the filler material increasing the strength of the regions.

12. A bumper reinforcement structure comprising:

vehicle side frames provided along a longitudinal vehicle direction, said vehicle side frames having an axial center;

a bumper reinforcement disposed at longitudinal end portions of said vehicle side frames and extending transverse to the vehicle side frames;

an upper projecting portion provided at said bumper reinforcement and projecting further upwardly than the longitudinal end portions of said vehicle side frames;

a lower projecting portion provided at said bumper reinforcement and projecting further downwardly than the longitudinal end portions of said vehicle side frames; and load transmitting means which, of said upper projecting portion and said lower projecting portion, is provided at least at said lower projecting portion, and which is not rigidly fixed to longitudinally extending side walls of said vehicle side frames, and which, at the time of a collision, applies to said vehicle side frames a force that creates a second bending moment in a direction opposite to a first bending moment applied to the vehicle side frames by a collision force acting on the bumper reinforcement at a position offset from the axial center of the vehicle side frames.

13. A bumper reinforcement structure according to claim 12, wherein said load transmitting means has a pushing surface which opposes, with a slight gap therebetween, surfaces of the side walls of said vehicle side frames to which said force is applied by said load transmitting means, and the pushing surface and the surfaces of the side walls of said vehicle side frames are inclined with respect to the axial center and are substantially parallel to one another.

14. A bumper reinforcement structure according to claim 12, wherein said load transmitting means is a bracket which is mounted to said bumper reinforcement.

15. A bumper reinforcement structure according to claim 12, wherein said bumper reinforcement has a second projecting portion which projects along the longitudinal vehicle direction parallel with the vehicle side frames, said second projecting portion also including said load transmitting means.

16. A bumper reinforcement structure according to claim 15, wherein said second projecting portion extends along a longitudinal direction of said bumper reinforcement.

17. A bumper reinforcement structure according to claim 16, wherein a vehicle longitudinal direction cross-section of said second projecting portion is a hollow, closed cross-section.

18. A bumper reinforcement structure according to claim 12, wherein said bumper reinforcement has a main bumper reinforcement positioned at a side far from the longitudinal end portions of said side frames and an auxiliary bumper reinforcement positioned at a side close to the longitudinal end portions of said side frames, and said load transmitting means is provided at the auxiliary bumper reinforcement.

19. A bumper reinforcement structure according to claim 18, wherein said bumper reinforcement has a second projecting portion which projects along the longitudinal vehicle direction parallel with the vehicle side frames, said second projecting portion also including said load transmitting means.

20. A bumper reinforcement structure according to claim 19, wherein said second projecting portion extends longitudinally along the auxiliary bumper reinforcement.

21. A bumper reinforcement structure according to claim 20, wherein a vehicle longitudinal direction cross-section of said second projecting portion is a hollow, closed cross-section.

22. A bumper reinforcement structure according to claim 21, wherein a filler material is provided at a region of the auxiliary bumper reinforcement and at a region of the main bumper reinforcement, which regions serve as buffer portions for the longitudinal end portions of said side frames, the filler material increasing the strength of the regions.

* * * * *